United States Patent
Xiao et al.

(10) Patent No.: US 12,175,206 B2
(45) Date of Patent: Dec. 24, 2024

(54) METHOD AND APPARATUS FOR MACHINE READING COMPREHENSION, AND NON-TRANSITORY COMPUTER-READABLE RECORDING MEDIUM

(71) Applicants: Tianxiong Xiao, Beijing (CN); Rui Cheng, Beijing (CN); Bin Dong, Beijing (CN); Shanshan Jiang, Beijing (CN); Jiashi Zhang, Beijing (CN)

(72) Inventors: Tianxiong Xiao, Beijing (CN); Rui Cheng, Beijing (CN); Bin Dong, Beijing (CN); Shanshan Jiang, Beijing (CN); Jiashi Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 318 days.

(21) Appl. No.: 17/821,227

(22) Filed: Aug. 22, 2022

(65) Prior Publication Data
US 2023/0073746 A1    Mar. 9, 2023

(30) Foreign Application Priority Data
Sep. 7, 2021    (CN) .......................... 202111045757.9

(51) Int. Cl.
*G06F 40/30*    (2020.01)
*G06F 16/33*    (2019.01)
(Continued)

(52) U.S. Cl.
CPC .............. *G06F 40/47* (2020.01); *G06F 16/33* (2019.01); *G06F 16/3329* (2019.01);
(Continued)

(58) Field of Classification Search
CPC ........ G06F 40/47; G06F 40/205; G06F 40/30; G06N 3/0455
See application file for complete search history.

(56) References Cited

U.S. PATENT DOCUMENTS

2019/0156220 A1*  5/2019  Zhu ..................... G06N 3/042
2020/0380213 A1* 12/2020  McCann ............ G06F 16/3344
(Continued)

FOREIGN PATENT DOCUMENTS

| CN | 112052326 A | * | 12/2020 | |
|---|---|---|---|---|
| CN | 113221553 | | 8/2021 | |
| CN | 113742468 B | * | 4/2024 | ......... G06F 16/3329 |

OTHER PUBLICATIONS

Wang, B. et al. On Position Embeddings in BERT Jan. 2021 pp. 1-21 [online], [retrieved on Jul. 27, 2023], Retrieved from <http://web.archive.org/web/20210118235629/https://openreview.net/forum?id=onxoVA9FxMw>.

(Continued)

*Primary Examiner* — Linda Wong
(74) *Attorney, Agent, or Firm* — IPUSA, PLLC

(57) ABSTRACT

A method and an apparatus for machine reading comprehension, and a non-transitory computer-readable recording medium are provided. In the method, a paragraph-question pair is obtained, and subword vectors corresponding to subwords in the paragraph-question pair are generated. Then, for each subword, relative positions of the subword with respect to the other subwords are determined based on distances, and self-attention information of the subword in a first part and mutual attention information of the subword in a second part are calculated by using the relative positions and the subword vector. Then, a fusion vector of the subword is generated based on the self-attention information and the mutual attention information. Then, the fusion vectors of the subwords are input to a decoder of a machine reading comprehension model so as to obtain an answer predicted by the decoder.

20 Claims, 6 Drawing Sheets

(51) Int. Cl.
  *G06F 16/332* (2019.01)
  *G06F 40/205* (2020.01)
  *G06F 40/40* (2020.01)
  *G06F 40/47* (2020.01)
  *G06F 40/56* (2020.01)
  *G06N 3/0455* (2023.01)
  *G06N 5/02* (2023.01)
  *G06N 7/00* (2023.01)

(52) U.S. Cl.
  CPC ........ *G06F 16/3334* (2019.01); *G06F 40/205* (2020.01); *G06F 40/30* (2020.01); *G06F 40/40* (2020.01); *G06F 40/56* (2020.01); *G06N 3/0455* (2023.01); *G06N 5/02* (2013.01); *G06N 7/00* (2013.01)

(56) References Cited

U.S. PATENT DOCUMENTS

2021/0192149 A1* 6/2021 Grail .................. G06N 3/08
2021/0390454 A1  12/2021 Xiao et al.

OTHER PUBLICATIONS

Office Action dated Aug. 8, 2023 issued with respect to the corresponding Japanese Patent Application No. 2022-140877.

* cited by examiner

|  | the | cu | ##lm | ## ination | of | the | neo |
|---|---|---|---|---|---|---|---|
| WORD STARTING INFORMATION | 1 | 1 | 0 | 0 | 1 | 1 | 1 |
| WORD ENDING INFORMATION | 1 | 0 | 0 | 1 | 1 | 1 | 1 |

METHOD AND APPARATUS FOR MACHINE READING COMPREHENSION, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 202111045757.9 filed on Sep. 7, 2021, the entire contents of which are incorporated herein by reference.

BACKGROUND OF THE INVENTION

1. Field of the Invention

The present invention relates to the field of machine reading comprehension (MRC) in natural language processing (NLP), and specifically, a method and an apparatus for machine reading comprehension, and a non-transitory computer-readable recording medium.

2. Description of the Related Art

Machine reading comprehension technology is a technology that makes a computer understand the semantics of an article and answer related questions by using an algorithm. The article and questions are expressed by a written text formed by using a human language. The article may include one or more paragraphs. The input of a machine reading comprehension model is a paragraph-question pair consisting of a paragraph and a question. The paragraph and the question are usually a piece of text. The output of the machine reading comprehension model is a predicted answer to the question.

There are many types of answers output by the machine reading comprehension model, which may be classified into multiple-choice type, interval answer type, and free generation type. The multiple-choice type means that the answer is selected from a plurality of preset answer options. The interval answer type means that the starting and ending positions of the answer are recognized from a paragraph to provide the answer. The free generation type means that the answer is generated by itself.

FIG. 1 shows a general architecture of a machine reading comprehension model. The machine reading comprehension model usually includes an encoding layer, an interaction layer, and a decoding layer (the decoding layer may also be called a decoder or an output layer). The coding layer may perform underlying processing on a paragraph and a question respectively, and convert the paragraph-question pair into digital codes, transform them into information units that can be processed by a computer. In the encoding process, the model needs to retain semantics of original sentences in an article.

The interaction layer may make the model focus on the semantic correlation between the paragraph and the question, deepen the understanding of the question by using the semantic analysis of the paragraph, and deepen the understanding of the paragraph by using the semantic analysis of the question. The reading comprehension model considers both the semantic of the paragraph and the semantic of the question, thereby deepening the understanding of the semantic of the paragraph and the semantic of the question.

Through the interaction layer, the model establishes the semantic correlation between the paragraph and the question, thereby predicting the answer to the question. The module that performs the prediction function is called the decoding layer (the decoder or the output layer). As mentioned above, there are many types of answers for machine reading comprehension tasks, such as interval answer type, multiple choice type, and the like. Thus, the specific form of the decoding layer needs to be associated with the answer type of the task. In addition, the decoding layer determines the evaluation function and loss function when the model is optimized.

The inventors found that the conventional machine reading comprehension model usually only considers the semantic correlation between the paragraph and the question in the interaction layer, so it is necessary to improve the model to predict the answer more accurately.

SUMMARY OF THE INVENTION

According to an aspect of the present invention, a method for machine reading comprehension is provided. The method includes obtaining a paragraph-question pair including a paragraph and a question, and generating subword vectors corresponding to subwords in the paragraph-question pair; for each subword in the paragraph-question pair, determining, based on distances between the subword and other subwords in the paragraph-question pair, relative positions of the subword with respect to the other subwords in the paragraph-question pair, and calculating self-attention information of the subword in a first part and mutual attention information of the subword in a second part by using the relative positions and the subword vector of the subword, the first part being the paragraph or the question where the subword is located, in a case where the first part is the paragraph, the second part being the question, and in a case where the first part is the question, the second part being the paragraph; for each subword in the paragraph-question pair, generating, based on the self-attention information and the mutual attention information of the subword, a fusion vector of the subword; and inputting the fusion vectors of the subwords in the paragraph-question pair to a decoder of a machine reading comprehension model so as to obtain an answer predicted by the decoder.

According to another aspect of the present invention, an apparatus for machine reading comprehension is provided. The apparatus includes a memory storing computer-executable instructions; and one or more processors. The one or more processors are configured to execute the computer-executable instructions such that the one or more processors are configured to obtain a paragraph-question pair including a paragraph and a question, and generate subword vectors corresponding to subwords in the paragraph-question pair; for each subword in the paragraph-question pair, determine, based on distances between the subword and other subwords in the paragraph-question pair, relative positions of the subword with respect to the other subwords in the paragraph-question pair, and calculate self-attention information of the subword in a first part and mutual attention information of the subword in a second part by using the relative positions and the subword vector of the subword, the first part being the paragraph or the question where the subword is located, in a case where the first part is the paragraph, the second part being the question, and in a case where the first part is the question, the second part being the paragraph; for each subword in the paragraph-question pair, generate, based on the self-attention information and the mutual attention information of the subword, a fusion vector of the subword; and input the fusion vectors of the subwords in the paragraph-question pair to a decoder of a machine reading comprehension model so as to obtain an answer predicted by the decoder.

According to another aspect of the present invention, a non-transitory computer-readable recording medium having computer-executable instructions for execution by one or more processors is provided. The computer-executable instructions, when executed, cause the one or more processors to carry out a method for machine reading comprehension. The method includes obtaining a paragraph-question pair including a paragraph and a question, and generating subword vectors corresponding to subwords in the paragraph-question pair; for each subword in the paragraph-question pair, determining, based on distances between the subword and other subwords in the paragraph-question pair, relative positions of the subword with respect to the other subwords in the paragraph-question pair, and calculating self-attention information of the subword in a first part and mutual attention information of the subword in a second part by using the relative positions and the subword vector of the subword, the first part being the paragraph or the question where the subword is located, in a case where the first part is the paragraph, the second part being the question, and in a case where the first part is the question, the second part being the paragraph; for each subword in the paragraph-question pair, generating, based on the self-attention information and the mutual attention information of the subword, a fusion vector of the subword; and inputting the fusion vectors of the subwords in the paragraph-question pair to a decoder of a machine reading comprehension model so as to obtain an answer predicted by the decoder.

BRIEF DESCRIPTION OF THE DRAWINGS

The above and other objects, features and advantages of the present invention will be further clarified the following detailed description of embodiments of the present invention in combination with the drawings.

DESCRIPTION OF THE EMBODIMENTS

Figure 1:
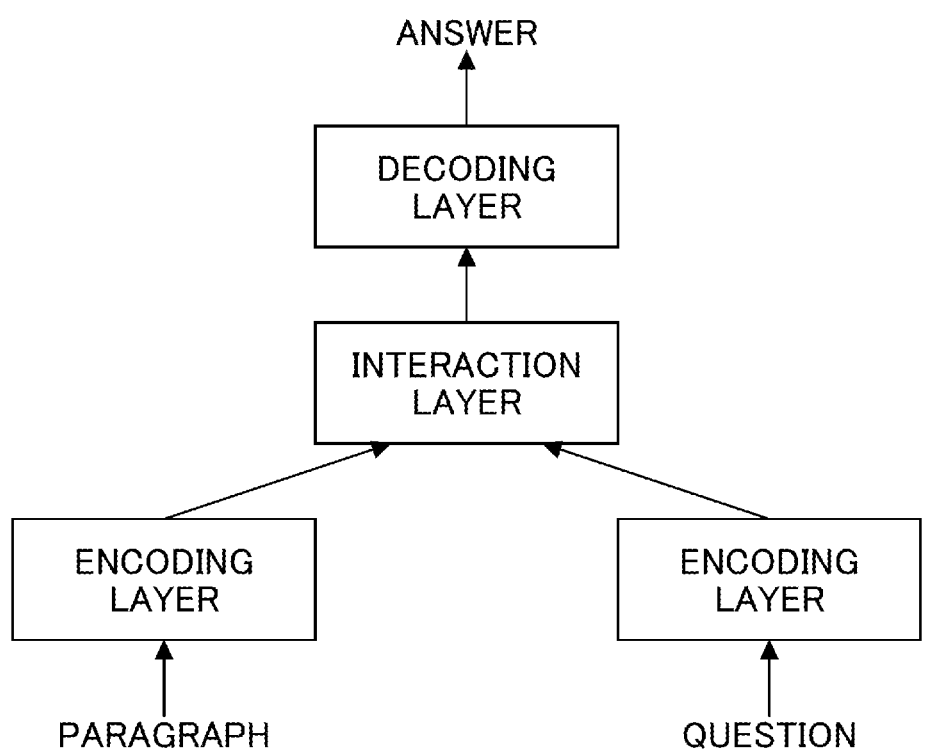
FIG. 1 is a schematic diagram illustrating an architecture of a conventional machine reading comprehension model.

In the following, specific embodiments of the present invention will be described in detail with reference to the accompanying drawings, so as to facilitate the understanding of technical problems to be solved by the present invention, technical solutions of the present invention, and advantages of the present invention. The present invention is not limited to the specifically described embodiments, and various modifications, combinations and replacements may be made without departing from the scope of the present invention. In addition, descriptions of well-known functions and constructions are omitted for clarity and conciseness.

Note that "one embodiment" or "an embodiment" mentioned in the present specification means that specific features, structures or characteristics relating to the embodiment are included in at least one embodiment of the present invention. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in sequential order, however the order in which the steps are performed is not limited to a sequential order. Further, the described steps may be performed in parallel or independently.

In order to facilitate the understanding of the embodiments of the present invention, concepts relating to the embodiments of the present invention will be briefly described.

1. Word

Words are the smallest unit that can be used independently in a language, and words have an independent position and function in the syntactic structure. For example, in English, the word usually refers to an English word that includes one or more English letters. Furthermore, in English sentence representation, there are usually one or more spaces or punctuation marks between words. In Chinese, the word usually refers to a Chinese word that includes one or more Chinese characters. In Chinese sentence representation, there is usually no separator between words. Furthermore, characters usually refer to letters in English, Chinese characters in Chinese, and various punctuation marks (such as periods, commas and the like).

2. Subword

Subwords, which are also referred to as "subword units", are text representation units between characters and words. For example, the English word "homework", which includes eight characters, may be divided into two subwords "home" and "work", and may also be divided into three subwords "ho", "me" and "work". As another example, the Chinese word "Sheng Ming Tan Ce Yi", which includes five characters, may be divided into two subwords "Sheng Ming" and "Tan Ce Yi", and may also be divided into three subwords "Sheng Ming", "Tan Ce" and "Yi".

In view of the problem of the conventional technology, an object of the embodiments of the present invention is to provide a method and an apparatus for machine reading comprehension, and a non-transitory computer-readable recording medium that can improve the performance of a machine reading comprehension model thereby predicting answers more accurately.

Figure 2:
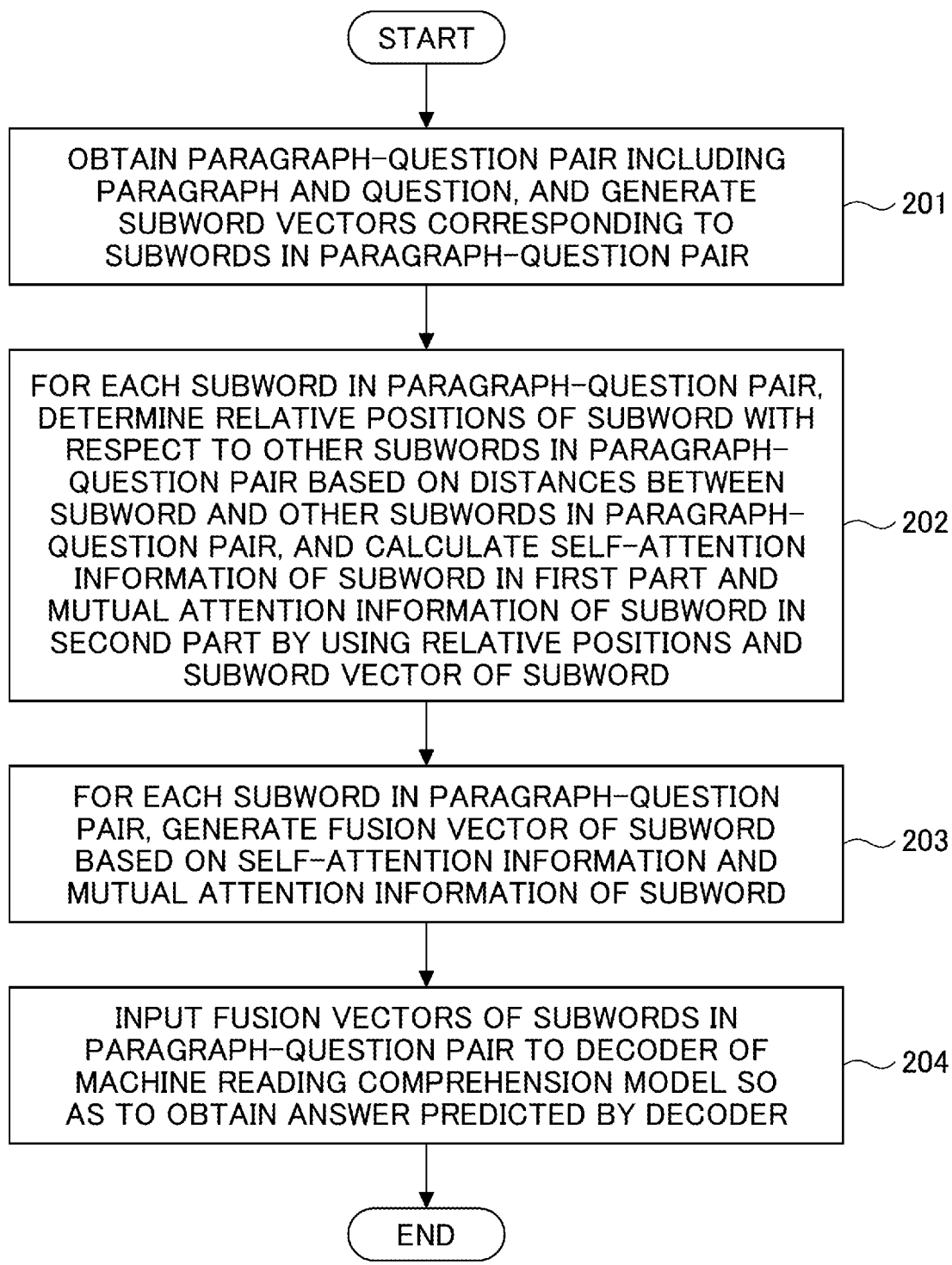
FIG. 2 is a flowchart illustrating a machine reading comprehension method according to an embodiment of the present invention.

In an embodiment of the present invention, a machine reading comprehension method is provided. FIG. 2 is a flowchart illustrating the machine reading comprehension method according to the embodiment of the present invention. The machine reading comprehension method may be specifically applied to predicting an answer to a question in languages such as English, Japanese, Chinese and the like. As shown in FIG. 2, the machine reading comprehension method includes steps 201 to 204.

In step 201, a paragraph-question pair including a paragraph and a question is obtained, and subword vectors corresponding to subwords in the paragraph-question pair are generated.

Here, the paragraph-question pair includes a paragraph and a question, and the paragraph and the question are usually a piece of text. The task of the machine reading comprehension model is to understand the semantics of the paragraph-question pair by using an algorithm, and to predict an answer to the question.

After obtaining the above paragraph-question pair, word segmentation may be performed on the paragraph-question pair by using various word segmentation technologies so as to obtain the subwords included in the paragraph-question pair. Conventional word segmentation technologies include word segmentation methods based on dictionaries and grammar rules, and word segmentation methods based on statistics. In the word segmentation method based on dictionaries and grammar rules, word segmentation is performed by using dictionary matching and grammar knowledge. The principle of such a method is to match strings in the paragraph-question pair with the entries in the dictionaries one by one. If a certain string is found in the dictionary, the matching is successful, and the segmentation may be performed, otherwise the segmentation is not performed. The word segmentation methods based on dictionaries and grammar rules specifically include a word-by-word traversal method, a maximum matching method, and a minimum subword splitting method. The word segmentation method based on statistics, such as a word segmentation method based on word frequency statistics, determine whether characters constitute a word, based on statistical frequencies of the characters appearing in the paragraph-question pair by using a method of word frequency statistics.

After word segmentation, subwords in the paragraph-question pair may be vectorized. The subword vectors corresponding to the subwords in the paragraph-question pair are obtained, by adding abundant information using character encoding and using context encoding. The subword vector includes the meaning of the corresponding subword in the specific context. The context encoding may specifically use tools such as a recurrent Neural network (RNN), a convolutional neural network (CNN) or the like.

In addition, in the embodiment of the present invention, the above processing may be performed on the paragraph-question pair by using a coding layer of a conventional machine reading comprehension model, and the detailed description thereof is omitted here.

In step 202, for each subword in the paragraph-question pair, relative positions of the subword with respect to the other subwords in the paragraph-question pair are determined based on distances between the subword and other subwords in the paragraph-question pair. Then, in step 202, self-attention information of the subword in a first part and mutual attention information of the subword in a second part are calculated by using the relative positions and the subword vector of the subword. Here, the first part is the paragraph or the question where the subword is located. In a case where the first part is the paragraph, the second part is the question, and in a case where the first part is the question, the second part is the paragraph.

Here, a specific position of the subword in the paragraph-question pair may be indicated by using an absolute position. For example, according to an order of the subwords in the paragraph-question pair, the absolute positions of the subwords in the paragraph-question pair are expressed as position 1, position 2, position 3, . . . , and so on. The relative position reflects the relative distance between two subwords, which may be specifically represented by an absolute value of a difference between the absolute positions of the two subwords. For example, $R_i$ and $R_j$ represent the absolute positions of the subword i and the subword j, respectively, and the relative position $R_{ij}$ of the subword i and the subword j may be expressed as follows.

$$R_{ij}=|R_i-R_j|$$

In step 202, for a subword in a certain part (such as a paragraph or an answer) of the paragraph-question pair, the mutual attention information of the subword in another part of the paragraph-question pair is calculated, and the self-attention information of the subword in the same part of the paragraph-question pair is calculated.

In step 203, for each subword in the paragraph-question pair, a fusion vector of the subword is generated based on the self-attention information and the mutual attention information of the subword.

Here, as an implementation example, for each subword in the paragraph-question pair, the self-attention information and the mutual attention information of the subword are fused so as to obtain the fusion vector of the subword. As another implementation example, for each subword in the paragraph-question pair, the self-attention information and the mutual attention information of the subword are fused so as to obtain attention information of the subword. Then, the attention information of the subword and word boundary information of the subword in a word to which the subword belongs are fused so as to obtain the fusion vector of the subword. In this way, both the self-attention information and the word boundary information of the subword are introduced into the fusion vector of the subword.

In step 204, the fusion vectors of the subwords in the paragraph-question pair are input to a decoder of a machine reading comprehension model so as to obtain an answer predicted by the decoder.

Here, in the embodiment of the present invention, as an example of inputting the fusion vectors of the subwords to the machine reading comprehension model, the fusion vectors may be input to the decoder of the machine reading comprehension model (which may also be called an output layer, an answer prediction module, a decoder module or the like). Considering that there are various types of answers for machine reading comprehension tasks, such as interval answer type, multiple-choice type and the like, the specific form of the decoder needs to be associated with the answer type of the task, and the embodiment of the present invention is not limited to the type of the decoder. That is, the embodiments of the present invention may be applied to various types of decoders. After inputting the fusion vectors of the subwords in the paragraph-question pair to the decoder, the decoder may output the predicted answer, thereby performing model training on the machine reading comprehension model or performing answer prediction by using the answer.

Through the above steps, the self-attention information and the mutual attention information of the subwords are combined and are fused into the fusion vector of the subword, so that the fusion vector contains more semantic interaction information, and the decoder can predict an answer based on more expressive interaction information, thereby improving the accuracy of answer prediction. In addition, the word boundary information is further incorporated into the fusion vectors of the subwords, so that the predicted answer boundary is more accurate, thereby improving the prediction performance of the model.

The above steps will be illustrated in more detail below. Note that formulas or algorithms in the following description are only examples for implementing the above steps in the embodiments of the present invention, and are not intended to limit the present invention.

As a specific implementation example, in step 202, for each subword in the paragraph-question pair, self-attention weights of subwords in the first part are calculated by using the relative positions of the subword with respect to the subwords in the first part. Then, weighted summation is performed on the subword vectors corresponding to the subwords in the first part by using the self-attention weights, so as to obtain the self-attention information of the subword in the first part.

For example, for the subword i in the first part, the self-attention weight $W_{i,j}$ between the subword i and the subword j in the first part is expressed as the follows.

$$W_{i,j} = \text{Attention}(v_i, v_j, R_{ij})$$

The self-attention information $S_i$ of the subword i in the first part is expressed as the follows.

$$S_i = \sum_{j \in self\text{-}attention} W_{i,j} v_j$$

Where $v_i$ and $v_j$ are the subword vectors of the subword i and the subword j, respectively. For example, the calculation may be performed by using the vectors of the subword i and the subword j output by a coding layer of a conventional machine reading comprehension model. Attention( ) represents the calculation formula of the attention weights. $j \in$ self-attention means that j is a subword in the first part. In addition, for the convenience of calculation, the self-attention weight $W_{i,j}$ may be a normalized weight, that is, the sum of the self-attention weights $W_{i,j}$ between the subword i and all of the subwords j in the first part is 1.

Similarly, in step 202, for each subword in the paragraph-question pair, mutual attention weights of subwords in the second part are calculated by using the relative positions of the subword with respect to the subwords in the second part. Then, weighted summation is performed on the subword vectors corresponding to the subwords in the second part by using the mutual attention weights, so as to obtain the mutual attention information of the subword in the second part.

For example, for the subword i in the first part, the mutual attention weight $W_{i,j}$ between the subword i and the subword j in the second part is expressed as the follows.

$$W_{i,j} = \text{Attention}(v_i, v_j, R_{ij})$$

The mutual attention information $M_i$ of the subword i in the second part is expressed as the follows.

$$M_i = \sum_{j \in mutual\ attention} W'_{i,j} v_j$$

Where $v_i$ and $v_j$ are the subword vectors of the subword i and the subword j, respectively. For example, the calculation may be performed by using the vectors of the subword i and the subword j output by a coding layer of a conventional machine reading comprehension model. Attention( ) represents the calculation formula of the attention weights. $j \in$ mutual attention means that j is a subword in the second part. In addition, for the convenience of calculation, the mutual attention weight $W_{i,j}$ may be a normalized weight, that is, the sum of the mutual attention weights $W_{i,j}$ between the subword i and all of the subwords j in the second part is 1.

A specific calculation formula for the attention weights is provided below.

$$\text{Attention}(v_i, v_j, R_{ij}) = \text{softMax}(v_i W_i W_j T v_j T + R_{ij})$$

Where $W_i$ and $W_j$ are the weight parameters of the subword i and the subword j, respectively. For example, the calculation may be performed by using a weight matrix of the subword i and the subword j output by a coding layer of a conventional machine reading comprehension model.

In an implementation example of step 203, the self-attention information and the mutual attention information of the subword are fused to obtain the attention information of the subword, and the attention information of the subword is used as the fusion vector of the subword. Specifically, vector addition, vector merging or other fusion methods (such as weighting the vectors and adding the weighted vectors) may be performed on the self-attention information and the mutual attention information of the subword. The above fusion is expressed by the formula as follows.

$$H_i = \text{Aggregate}(S_i, M_i)$$

Where $H_i$ represents the attention information of the subword i, and Aggregate( ) represents an aggregation function. For example, a specific aggregation function is as follows.

$$\text{Aggregate}(S_i, M_i) = S_i + M_i$$

The above aggregation function represents the fusion method of vector addition.

In another implementation example of step 203, the attention information of the subword (that is, $H_i$ in the above formula) and the word boundary information of the subword in a word to which the subword belongs may be further fused to obtain the fusion vector of the subword. Specifically, for each subword, word starting information corresponding to the subword is determined based on whether the subword is the first subword in the word to which the subword belongs, and word ending information corresponding to the subword is determined based on whether the subword is the last subword in the word to which the subword belongs. Then, vector fusion is performed on the attention information, the word starting information and the word ending information of the subword, so as to obtain the fusion vector of the subword. Here, the word boundary information of the subword in the word to which the subword belongs refers to whether the position of the subword in the word to which the subword belongs is a starting position of the word or an ending position of the word. The vector fusion includes vector merging, vector addition, or other fusion methods. An implementation example of vector merging is provided as follows.

For example, for the subword i, the word boundary information is calculated as follows.

Figures 3, 4:
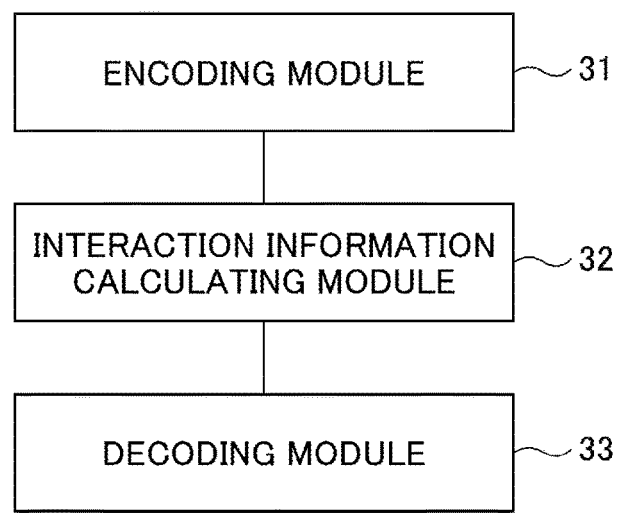
FIG. 3 is a schematic diagram illustrating an example of word boundary information.
FIG. 4 is a block diagram illustrating the configuration of a machine reading comprehension apparatus according to an embodiment of the present invention.

$F_i^s = 1, 0$, subword i is the first subword in the word
else $F_i^e = 1, 0$, subword i is the last subword in the word
else FIG. 3 is a schematic diagram illustrating an example of word boundary information. As shown in FIG. 3, the word starting information indicates a potential answer starting position, and the word ending information indicates a potential answer ending position. For example, in algorithms such as byte pair encoding (BPE), some rare words may be divided into subwords, for example, word "culmination" is divided into (cu, πκlm, πκination) as shown in FIG. 3. Obviously, πκlm and πκination are not the starting position of the answer, so the word starting information of this part is 0. Here, 0 in the word starting information means that the subword is not at the starting position of the word, and 1 means that the subword is at the starting position of the word. 0 in the ending information means that the subword is not at the ending position of the word, and 1 means that the subword is at the ending position of the word.

Then, word starting information and the word ending information are introduced into the model by using a fusion function, so as to obtain a final fusion vector representation $\tilde{H}_i$.

$$\tilde{H}_i = \text{Merge}(H_i, F_i^s, F_i^e)$$

For example, a fusion function Merge( ) is expressed as follows. That is, simple vector merging is performed.

$$\text{Merge}(H_i, F_i^s, F_i^e) = [H_i; F_i^s; F_i^e]$$

The final fusion vector representation $\tilde{H}_i$ is input to the decoder (which may be also called the output layer or the answer prediction module) to obtain the answer.

Compared with the conventional technology, in the machine reading comprehension method according to the embodiment of the present invention, the self-attention information and the mutual attention information of the subwords are combined and are fused into the fusion vector of the subword, so that the fusion vector contains more semantic interaction information, and the decoder (the decoding layer or the output layer) can predict an answer based on more expressive interaction information, thereby improving the accuracy of answer prediction. In addition, the word boundary information is further incorporated into the fusion vectors of the subwords, so that the predicted answer boundary is more accurate, thereby improving the prediction performance of the model.

Based on the machine reading comprehension method according to the above embodiment, in another embodiment of the present invention, a non-transitory computer-readable recording medium having computer-executable instructions for execution by one or more processors is further provided. The execution of the computer-executable instructions cause the one or more processors to carry out the machine reading comprehension method according the above embodiment. The method includes obtaining a paragraph-question pair including a paragraph and a question, and generating subword vectors corresponding to subwords in the paragraph-question pair; for each subword in the paragraph-question pair, determining, based on distances between the subword and other subwords in the paragraph-question pair, relative positions of the subword with respect to the other subwords in the paragraph-question pair, and calculating self-attention information of the subword in a first part and mutual attention information of the subword in a second part by using the relative positions and the subword vector of the subword, the first part being the paragraph or the question where the subword is located, in a case where the first part is the paragraph, the second part being the question, and in a case where the first part is the question, the second part being the paragraph; for each subword in the paragraph-question pair, generating, based on the self-attention information and the mutual attention information of the subword, a fusion vector of the subword; and inputting the fusion vectors of the subwords in the paragraph-question pair to a decoder of a machine reading comprehension model so as to obtain an answer predicted by the decoder.

In another embodiment of the present invention, a machine reading comprehension apparatus is further provided. FIG. 4 is a block diagram illustrating the configuration of a machine reading comprehension apparatus according to an embodiment of the present invention. As shown in FIG. 4, the machine reading comprehension apparatus includes an encoding module 31, an interaction information calculating module 32, and a decoding module 33.

The encoding module 31 obtains a paragraph-question pair including a paragraph and a question, and generates subword vectors corresponding to subwords in the paragraph-question pair.

For each subword in the paragraph-question pair, the interaction information calculating module 32 determines relative positions of the subword with respect to the other subwords in the paragraph-question pair, based on distances between the subword and other subwords in the paragraph-question pair. Then, the interaction information calculating module 32 calculates self-attention information of the subword in a first part and mutual attention information of the subword in a second part by using the relative positions and the subword vector of the subword. The first part is the paragraph or the question where the subword is located. In a case where the first part is the paragraph, the second part is the question, and in a case where the first part is the question, the second part is the paragraph. Then, for each subword in the paragraph-question pair, the interaction information calculating module 32 generates a fusion vector of the subword, based on the self-attention information and the mutual attention information of the subword.

The decoding module 33 inputs the fusion vectors of the subwords in the paragraph-question pair to a decoder of a machine reading comprehension model so as to obtain an answer predicted by the decoder.

By the machine reading comprehension apparatus according to the embodiments of the present invention, the accuracy of answer prediction can be improved.

Figure 5:
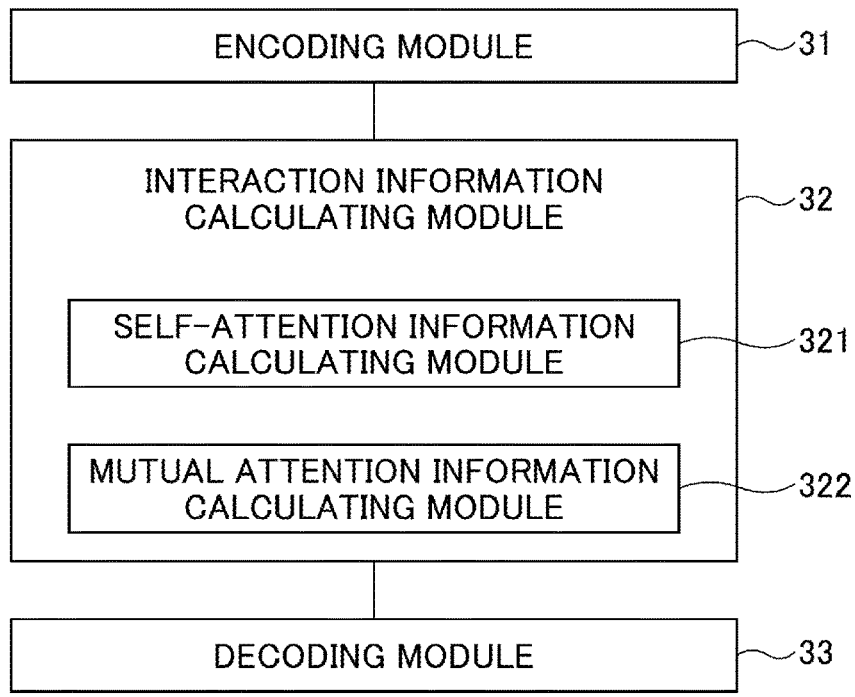
FIG. 5 is a block diagram illustrating the configuration of a machine reading comprehension apparatus according to another embodiment of the present invention.

FIG. 5 is a block diagram illustrating the configuration of a machine reading comprehension apparatus according to another embodiment of the present invention. As shown in FIG. 5, in the embodiment of the present invention, the interaction information calculating module 32 includes a self-attention information calculating module 321 and a mutual attention information calculating module 322.

For each subword in the paragraph-question pair, the self-attention information calculating module 321 calculates self-attention weights of subwords in the first part by using the relative positions of the subword with respect to the subwords in the first part. Then, the self-attention information calculating module 321 performs weighted summation on the subword vectors corresponding to the subwords in the first part by using the self-attention weights so as to obtain the self-attention information of the subword in the first part.

For each subword in the paragraph-question pair, the mutual attention information calculating module 322 calculates mutual attention weights of subwords in the second part by using the relative positions of the subword with respect to the subwords in the second part. Then, the mutual attention information calculating module 322 performs weighted summation on the subword vectors corresponding to the subwords in the second part by using the mutual attention weights so as to obtain the mutual attention information of the subword in the second part.

Figure 6:
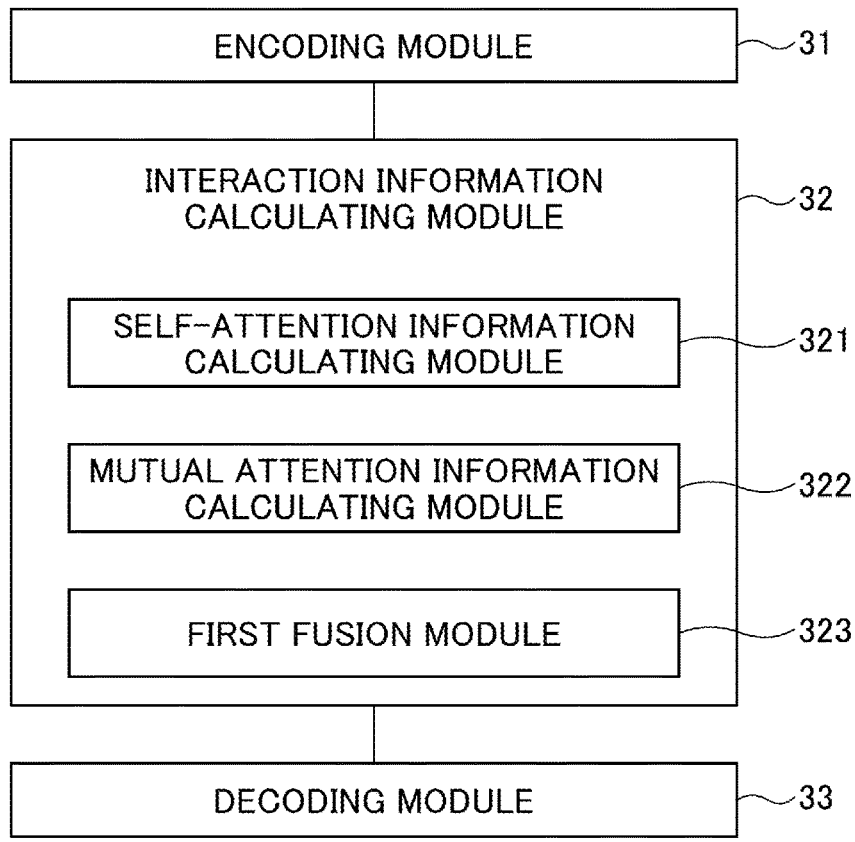
FIG. 6 is a block diagram illustrating the configuration of a machine reading comprehension apparatus according to another embodiment of the present invention.

FIG. 6 is a block diagram illustrating the configuration of a machine reading comprehension apparatus according to another embodiment of the present invention. As shown in FIG. 6. in the embodiment of the present invention, the interaction information calculating module 32 further includes a first fusion module 323.

For each subword in the paragraph-question pair, the first fusion module 323 fuses the self-attention information and the mutual attention information of the subword so as to obtain the fusion vector of the subword.

Figure 7:
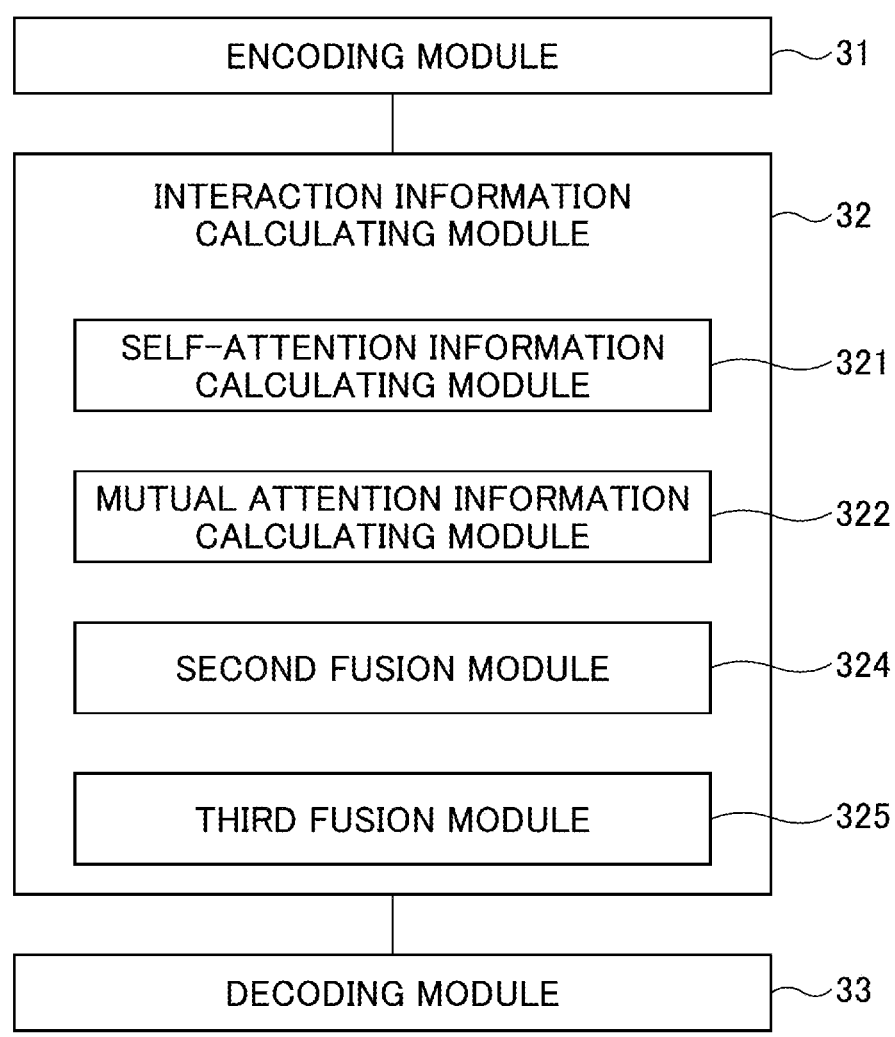
FIG. 7 is a block diagram illustrating the configuration of a machine reading comprehension apparatus according to another embodiment of the present invention.

FIG. 7 is a block diagram illustrating the configuration of a machine reading comprehension apparatus according to another embodiment of the present invention. As shown in FIG. 7, in the embodiment of the present invention, the interaction information calculating module 32 further includes a second fusion module 324 and a third fusion module 325.

For each subword in the paragraph-question pair, the second fusion module 324 fuses the self-attention information and the mutual attention information of the subword so as to obtain attention information of the subword.

The third fusion module 325 fuses the attention information of the subword and word boundary information of the subword in a word to which the subword belongs so as to obtain the fusion vector of the subword.

Here, the first fusion module or the second fusion module fuses the self-attention information and the mutual attention information of the subword. Specifically, vector addition or vector merging may be performed on the self-attention information and the mutual attention information of the subword.

Here, the third fusion module may specifically include a word boundary information generating module and a fusion processing module (not shown in FIG. 7).

The word boundary information generating module determines word starting information corresponding to the subword, based on whether the subword is the first subword in the word to which the subword belongs. Then, word boundary information generating module determines word ending information corresponding to the subword, based on whether the subword is the last subword in the word to which the subword belongs.

The fusion processing module performs vector fusion on the attention information, the word starting information and the word ending information of the subword so as to obtain the fusion vector of the subword.

Figure 8:
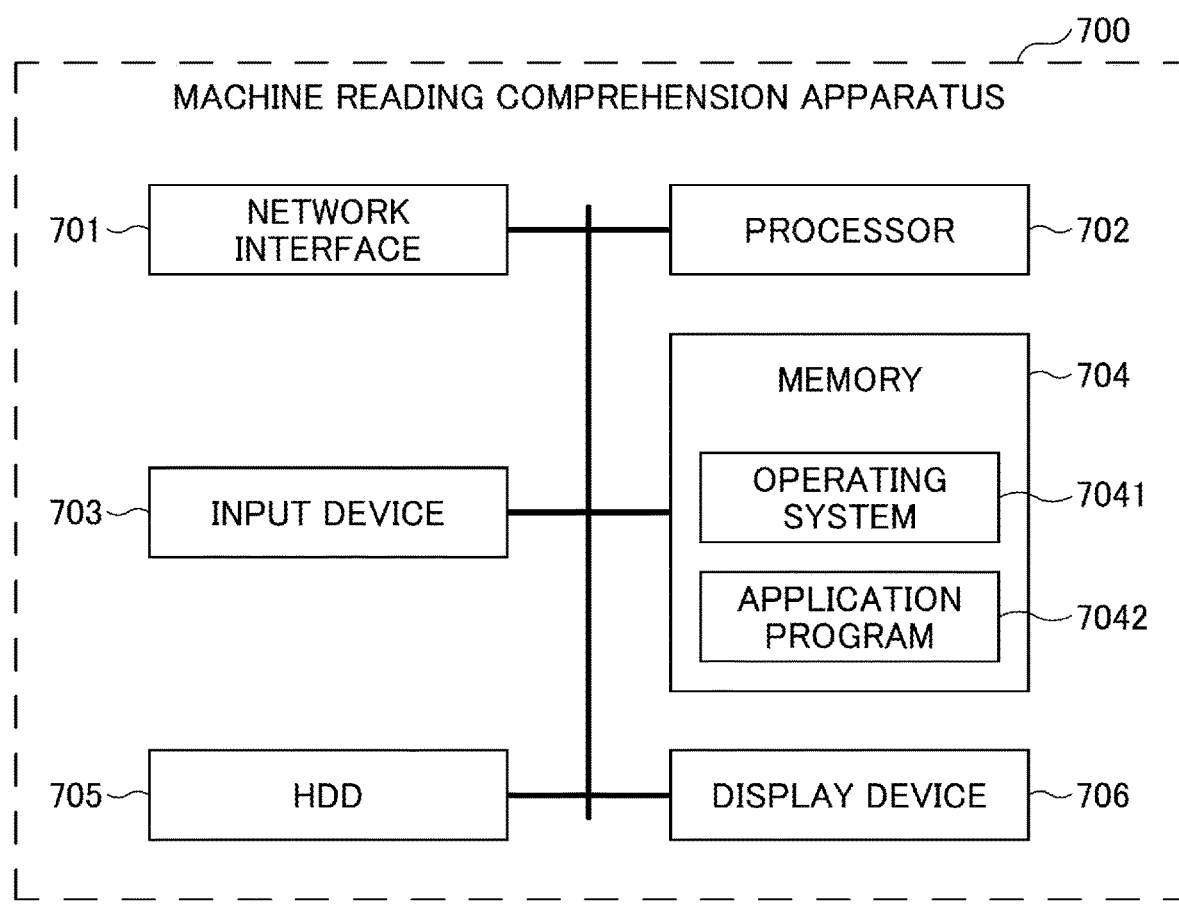
FIG. 8 is a block diagram illustrating the configuration of a machine reading comprehension apparatus according to another embodiment of the present invention.

FIG. 8 is a block diagram illustrating the configuration of a machine reading comprehension apparatus according to another embodiment of the present invention. As shown in FIG. 8, the machine reading comprehension apparatus 700 includes a processor 702, and a memory 704 storing computer-executable instructions.

When the computer-executable instructions are executed by the processor 702, the processor 702 obtains a paragraph-question pair including a paragraph and a question, and generates subword vectors corresponding to subwords in the paragraph-question pair. Then, for each subword in the paragraph-question pair, the processor 702 determines relative positions of the subword with respect to the other subwords in the paragraph-question pair based on distances between the subword and other subwords in the paragraph-question pair, and calculates self-attention information of the subword in a first part and mutual attention information of the subword in a second part by using the relative positions and the subword vector of the subword. The first part is the paragraph or the question where the subword is located. In a case where the first part is the paragraph, the second part is the question, and in a case where the first part is the question, the second part is the paragraph. Then, for each subword in the paragraph-question pair, the processor 702 generates a fusion vector of the subword based on the self-attention information and the mutual attention information of the subword. Then, the processor 702 inputs the fusion vectors of the subwords in the paragraph-question pair to a decoder of a machine reading comprehension model so as to obtain an answer predicted by the decoder.

Furthermore, as illustrated in FIG. 8, the machine reading comprehension apparatus 700 further includes a network interface 701, an input device 703, a hard disk drive (HDD) 705, and a display device 706.

Each of the ports and each of the devices may be connected to each other via a bus architecture. The processor 702, such as one or more central processing units (CPUs), and the memory 704, such as one or more memory units, may be connected via various circuits. Other circuits such as an external device, a regulator, and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 701 may be connected to a network (such as the Internet, a LAN or the like), receive data (such as training sentences of a model) from the network, and store the received data in the hard disk drive 705.

The input device 703 may receive various commands such as predetermined threshold and its setting information input by a user, and transmit the commands to the processor 702 to be executed. The input device 703 may include a keyboard, pointing devices (such as a mouse or a track ball), a touch board, a touch panel or the like.

The display device 706 may display a result obtained by executing the commands, for example, a predicted answer.

The memory 704 stores programs and data required for running an operating system, and data such as intermediate results in calculation processes of the processor 702.

Note that the memory 704 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which may be used as an external high-speed buffer. The memory 704 of the apparatus or the method is not limited to the described types of memory, and may include any other suitable memory.

In some embodiments, the memory 704 stores executable modules or data structure, their subsets, or their superset, i.e., an operating system (OS) 7041 and an application program 7042.

The operating system 7041 includes various system programs for implementing various essential tasks and processing tasks based on hardware, such as a frame layer, a core library layer, a drive layer and the like. The application program 7042 includes various application programs for implementing various application tasks, such as a browser and the like. A program for realizing the method according to the embodiments of the present invention may be included in the application program 7042.

The method according to the above embodiments of the present invention may be applied to the processor 702 or may be implemented by the processor 702. The processor 702 may be an integrated circuit chip capable of processing signals. Each step of the above method may be implemented by instructions in a form of integrated logic circuit of hardware in the processor 702 or a form of software. The processor 702 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, or alternatively, the processor may be any common processor. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 704, and the processor 702 reads information in the memory 704 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processing devices (DSPD), programmable logic devices (PLD), field programmable gate array signals (FPGA), general-purpose processors, controllers, micro-controllers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Preferably, when the computer-readable instructions are executed by the processor 702, for each subword in the paragraph-question pair the processor 702 may calculate self-attention weights of subwords in the first part by using the relative positions of the subword with respect to the subwords in the first part, and may perform weighted summation on the subword vectors corresponding to the subwords in the first part by using the self-attention weights so as to obtain the self-attention information of the subword in the first part.

Preferably, when the computer-readable instructions are executed by the processor 702, for each subword in the paragraph-question pair, the processor 702 may calculate mutual attention weights of subwords in the second part by using the relative positions of the subword with respect to the subwords in the second part, and perform weighted summation on the subword vectors corresponding to the subwords in the second part by using the mutual attention weights so as to obtain the mutual attention information of the subword in the second part.

Preferably, when the computer-readable instructions are executed by the processor 702, for each subword in the paragraph-question pair, the processor 702 may fuse the self-attention information and the mutual attention information of the subword so as to obtain the fusion vector of the subword.

Preferably, when the computer-readable instructions are executed by the processor 702, for each subword in the paragraph-question pair, the processor 702 may fuse the self-attention information and the mutual attention information of the subword so as to obtain attention information of the subword, and fuse the attention information of the subword and word boundary information of the subword in a word to which the subword belongs so as to obtain the fusion vector of the subword.

Preferably, when the computer-readable instructions are executed by the processor 702, the processor 702 may determine word starting information corresponding to the subword based on whether the subword is the first subword in the word to which the subword belongs, determine word ending information corresponding to the subword based on whether the subword is the last subword in the word to which the subword belongs, and perform vector fusion on the attention information, the word starting information and the word ending information of the subword so as to obtain the fusion vector of the subword.

Preferably, when the computer-readable instructions are executed by the processor 702, the processor 702 may perform vector addition or vector merging on the self-attention information and the mutual attention information of the subword.

As known by a person skilled in the art, the elements and algorithm steps of the embodiments disclosed herein may be implemented by electronic hardware or a combination of computer software and electronic hardware. Whether these functions are performed by hardware or software depends on the specific application and design constraints of the solution. A person skilled in the art may use different methods for implementing the described functions for each particular application, but such implementation should not be considered to be beyond the scope of the present invention.

As clearly understood by a person skilled in the art, for the convenience and brevity of the description, the specific working process of the system, the device and the unit described above may refer to the corresponding process in the above method embodiment, and detailed descriptions thereof are omitted here.

In the embodiments of the present application, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, the units may be located in one place, or may be distributed across network units. Some or all of the units may be selected according to actual needs to achieve the objectives of the embodiments of the present invention.

In addition, each functional unit the embodiments of the present invention may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present invention, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present invention. The above storage medium includes various media that can store program codes, such as a USB flash drive, a mobile hard disk, a ROM, a RAM, a magnetic disk, or an optical disk.

The present invention is not limited to the specifically described embodiments, and various modifications, combinations and replacements may be made without departing from the scope of the present invention.

What is claimed is:

1. A method for machine reading comprehension, the method comprising:
    obtaining a paragraph-question pair including a paragraph and a question, and generating subword vectors corresponding to subwords in the paragraph-question pair;
    for each subword in the paragraph-question pair, determining, based on distances between the subword and other subwords in the paragraph-question pair, relative positions of the subword with respect to the other subwords in the paragraph-question pair, and calculating self-attention information of the subword in a first part and mutual attention information of the subword in a second part by using the relative positions and the subword vector of the subword, the first part being the paragraph or the question where the subword is located, in a case where the first part is the paragraph, the second part being the question, and in a case where the first part is the question, the second part being the paragraph;
    for each subword in the paragraph-question pair, generating, based on the self-attention information and the mutual attention information of the subword, a fusion vector of the subword; and
    inputting the fusion vectors of the subwords in the paragraph-question pair to a decoder of a machine reading comprehension model so as to obtain an answer predicted by the decoder.

2. The method for machine reading comprehension as claimed in claim 1,
    wherein calculating the self-attention information of the subword in a first part includes
        for each subword in the paragraph-question pair, calculating self-attention weights of subwords in the first part by using the relative positions of the subword with respect to the subwords in the first part; and
        performing weighted summation on the subword vectors corresponding to the subwords in the first part by using the self-attention weights so as to obtain the self-attention information of the subword in the first part.

3. The method for machine reading comprehension as claimed in claim 1,
    wherein calculating the mutual attention information of the subword in a second part includes
        for each subword in the paragraph-question pair, calculating mutual attention weights of subwords in the second part by using the relative positions of the subword with respect to the subwords in the second part; and
        performing weighted summation on the subword vectors corresponding to the subwords in the second part by using the mutual attention weights so as to obtain the mutual attention information of the subword in the second part.

4. The method for machine reading comprehension as claimed in claim 1,
    wherein generating the fusion vector of the subword includes
        for each subword in the paragraph-question pair, fusing the self-attention information and the mutual attention information of the subword so as to obtain the fusion vector of the subword.

5. The method for machine reading comprehension as claimed in claim 1,
    wherein generating the fusion vector of the subword includes
        for each subword in the paragraph-question pair, fusing the self-attention information and the mutual attention information of the subword so as to obtain attention information of the subword; and
        fusing the attention information of the subword and word boundary information of the subword in a word to which the subword belongs so as to obtain the fusion vector of the subword.

6. The method for machine reading comprehension as claimed in claim 5,
    wherein fusing the attention information and the word boundary information includes
        determining, based on whether the subword is the first subword in the word to which the subword belongs, word starting information corresponding to the subword;
        determining, based on whether the subword is the last subword in the word to which the subword belongs, word ending information corresponding to the subword; and
        performing vector fusion on the attention information, the word starting information and the word ending information of the subword so as to obtain the fusion vector of the subword.

7. The method for machine reading comprehension as claimed in claim 4,
    wherein fusing the self-attention information and the mutual attention information of the subword includes
        performing vector addition or vector merging on the self-attention information and the mutual attention information of the subword.

8. An apparatus for machine reading comprehension, the apparatus comprising:
    a memory storing computer-executable instructions; and
    one or more processors configured to execute the computer-executable instructions such that the one or more processors are configured to
        obtain a paragraph-question pair including a paragraph and a question, and generate subword vectors corresponding to subwords in the paragraph-question pair;
        for each subword in the paragraph-question pair, determine, based on distances between the subword and other subwords in the paragraph-question pair, relative positions of the subword with respect to the other subwords in the paragraph-question pair, and calculate self-attention information of the subword in a first part and mutual attention information of the subword in a second part by using the relative positions and the subword vector of the subword, the first part being the paragraph or the question where the subword is located, in a case where the first part is the paragraph, the second part being the question, and in a case where the first part is the question, the second part being the paragraph;

for each subword in the paragraph-question pair, generate, based on the self-attention information and the mutual attention information of the subword, a fusion vector of the subword; and input the fusion vectors of the subwords in the paragraph-question pair to a decoder of a machine reading comprehension model so as to obtain an answer predicted by the decoder.

9. The apparatus for machine reading comprehension as claimed in claim 8, wherein the one or more processors are configured to for each subword in the paragraph-question pair, calculate self-attention weights of subwords in the first part by using the relative positions of the subword with respect to the subwords in the first part; and perform weighted summation on the subword vectors corresponding to the subwords in the first part by using the self-attention weights so as to obtain the self-attention information of the subword in the first part.

10. The apparatus for machine reading comprehension as claimed in claim 8, wherein the one or more processors are configured to for each subword in the paragraph-question pair, calculate mutual attention weights of subwords in the second part by using the relative positions of the subword with respect to the subwords in the second part; and perform weighted summation on the subword vectors corresponding to the subwords in the second part by using the mutual attention weights so as to obtain the mutual attention information of the subword in the second part.

11. The apparatus for machine reading comprehension as claimed in claim 8, wherein the one or more processors are configured to for each subword in the paragraph-question pair, fuse the self-attention information and the mutual attention information of the subword so as to obtain the fusion vector of the subword.

12. The apparatus for machine reading comprehension as claimed in claim 8, wherein the one or more processors are configured to for each subword in the paragraph-question pair, fuse the self-attention information and the mutual attention information of the subword so as to obtain attention information of the subword; and fuse the attention information of the subword and word boundary information of the subword in a word to which the subword belongs so as to obtain the fusion vector of the subword.

13. The apparatus for machine reading comprehension as claimed in claim 12, wherein the one or more processors are configured to determine, based on whether the subword is the first subword in the word to which the subword belongs, word starting information corresponding to the subword;

determine, based on whether the subword is the last subword in the word to which the subword belongs, word ending information corresponding to the subword; and perform vector fusion on the attention information, the word starting information and the word ending information of the subword so as to obtain the fusion vector of the subword.

14. The apparatus for machine reading comprehension as claimed in claim 11, wherein the one or more processors are configured to perform vector addition or vector merging on the self-attention information and the mutual attention information of the subword.

15. A non-transitory computer-readable recording medium having computer-executable instructions for execution by one or more processors, wherein, the computer-executable instructions, when executed, cause the one or more processors to carry out a method for machine reading comprehension, the method comprising:

obtaining a paragraph-question pair including a paragraph and a question, and generating subword vectors corresponding to subwords in the paragraph-question pair;

for each subword in the paragraph-question pair, determining, based on distances between the subword and other subwords in the paragraph-question pair, relative positions of the subword with respect to the other subwords in the paragraph-question pair, and calculating self-attention information of the subword in a first part and mutual attention information of the subword in a second part by using the relative positions and the subword vector of the subword, the first part being the paragraph or the question where the subword is located, in a case where the first part is the paragraph, the second part being the question, and in a case where the first part is the question, the second part being the paragraph;

for each subword in the paragraph-question pair, generating, based on the self-attention information and the mutual attention information of the subword, a fusion vector of the subword; and inputting the fusion vectors of the subwords in the paragraph-question pair to a decoder of a machine reading comprehension model so as to obtain an answer predicted by the decoder.

16. The non-transitory computer-readable recording medium as claimed in claim 15, wherein calculating the self-attention information of the subword in a first part includes for each subword in the paragraph-question pair, calculating self-attention weights of subwords in the first part by using the relative positions of the subword with respect to the subwords in the first part; and performing weighted summation on the subword vectors corresponding to the subwords in the first part by using the self-attention weights so as to obtain the self-attention information of the subword in the first part.

17. The non-transitory computer-readable recording medium as claimed in claim 15, wherein calculating the mutual attention information of the subword in a second part includes for each subword in the paragraph-question pair, calculating mutual attention weights of subwords in the second part by using the relative positions of the subword with respect to the subwords in the second part; and performing weighted summation on the subword vectors corresponding to the subwords in the second part by using the mutual attention weights so as to obtain the mutual attention information of the subword in the second part.

18. The non-transitory computer-readable recording medium as claimed in claim 15, wherein generating the fusion vector of the subword includes for each subword in the paragraph-question pair, fusing the self-attention information and the mutual attention information of the subword so as to obtain the fusion vector of the subword.

19. The non-transitory computer-readable recording medium as claimed in claim 15, wherein generating the fusion vector of the subword includes for each subword in the paragraph-question pair, fusing the self-attention information and the mutual attention information of the subword so as to obtain attention information of the subword; and fusing the attention information of the subword and word boundary information of the subword in a word to which the subword belongs so as to obtain the fusion vector of the subword.

20. The non-transitory computer-readable recording medium as claimed in claim 19, wherein fusing the attention information and the word boundary information includes determining, based on whether the subword is the first subword in the word to which the subword belongs, word starting information corresponding to the subword;

determining, based on whether the subword is the last subword in the word to which the subword belongs, word ending information corresponding to the subword; and performing vector fusion on the attention information, the word starting information and the word ending information of the subword so as to obtain the fusion vector of the subword.

\* \* \* \* \*